(12) United States Patent
Han et al.

(10) Patent No.: US 10,827,521 B2
(45) Date of Patent: Nov. 3, 2020

(54) CHANNEL SCHEDULING FOR SPATIAL REUSE

(71) Applicant: Hewlett Packard Enterprise Development LP, Houston, TX (US)

(72) Inventors: Jianpo Han, Beijing (CN); Qiang Zhou, Beijing (CN); Guangzhi Ran, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/356,143

(22) Filed: Mar. 18, 2019

(65) Prior Publication Data

US 2019/0335499 A1 Oct. 31, 2019

(51) Int. Cl.
*H04W 74/04* (2009.01)
*H04W 56/00* (2009.01)
*H04W 72/12* (2009.01)
*H04W 74/00* (2009.01)
*H04W 84/12* (2009.01)

(52) U.S. Cl.
CPC ......... *H04W 74/04* (2013.01); *H04W 56/001* (2013.01); *H04W 72/1273* (2013.01); *H04W 74/002* (2013.01); *H04W 84/12* (2013.01)

(58) Field of Classification Search
CPC ........... H04W 56/001; H04W 72/1273; H04W 74/002; H04W 74/04; H04W 74/0816; H04W 84/12
See application file for complete search history.

(56) References Cited

U.S. PATENT DOCUMENTS 9,107,229 B2  8/2015  Choudhury et al.
9,832,793 B2  11/2017  Xing et al.
(Continued)

FOREIGN PATENT DOCUMENTS

EP    3026974 A1    6/2016
WO  2014/179713 A1  11/2014

OTHER PUBLICATIONS

Afaqui, M.S., Contributions to the Evolution of Next Generation WLANS, (Research Paper), Mar. 2017, 199 Pgs.
(Continued)

*Primary Examiner* — Phuc H Tran
(74) *Attorney, Agent, or Firm* — Hewlett Packard Enterprise Patent Department

(57) ABSTRACT

An example device comprising: a processor to determine that a client device is located in an overlapping area between the first network device and a second network device, to synchronize a first clock of the first network device with a second clock of the second network device, to negotiate, with the second network device, a overlapping access window, an overlapping forbidden window, and a non-overlapping access window for the first network device and the second network device in beacon intervals, to allocate the overlapping access window, the overlapping forbidden window, and the non-overlapping access window by the first network device, to store the allocated overlapping access window, the allocated overlapping forbidden window, and the allocated non-overlapping access window as channel scheduling rules for spatial reuse, and to control frame transmission of the network device based on the channel scheduling rules.

13 Claims, 5 Drawing Sheets

(56) References Cited

U.S. PATENT DOCUMENTS

| | | |
|---|---|---|
| 9,854,453 B2 | 12/2017 | Wang et al. |
| 2013/0294438 A1 | 11/2013 | Ji et al. |
| 2014/0192826 A1* | 7/2014 | Zampetti ............... H04J 3/0644 |
| | | 370/503 |
| 2014/0269628 A1 | 9/2014 | Ghosh et al. |
| 2015/0173010 A1 | 6/2015 | Ghosh et al. |
| 2016/0157195 A1* | 6/2016 | Wang .................. H04W 56/001 |
| | | 370/350 |
| 2017/0294949 A1 | 10/2017 | Zhang et al. |

OTHER PUBLICATIONS

European Search Report and Search Opinion Received for EP Application No. 191518364, dated Jul. 3, 2019, 8 pages.

\* cited by examiner

CHANNEL SCHEDULING FOR SPATIAL REUSE

BACKGROUND

IEEE 802.11ax standard proposes a Inter-BSS (Basic Service Set) power detection mechanism and BSS coloring for spatial reuse. Therefore, a less sensitive Clear Channel Assessment (CCA) threshold may be used for frames transmitted to overlapping radio frequency (RF) coverage areas between adjacent APs. The less sensitive CCA threshold may enable more simultaneous transmissions, but also introduces more channel collisions.

DETAILED DESCRIPTION

Figure 1:
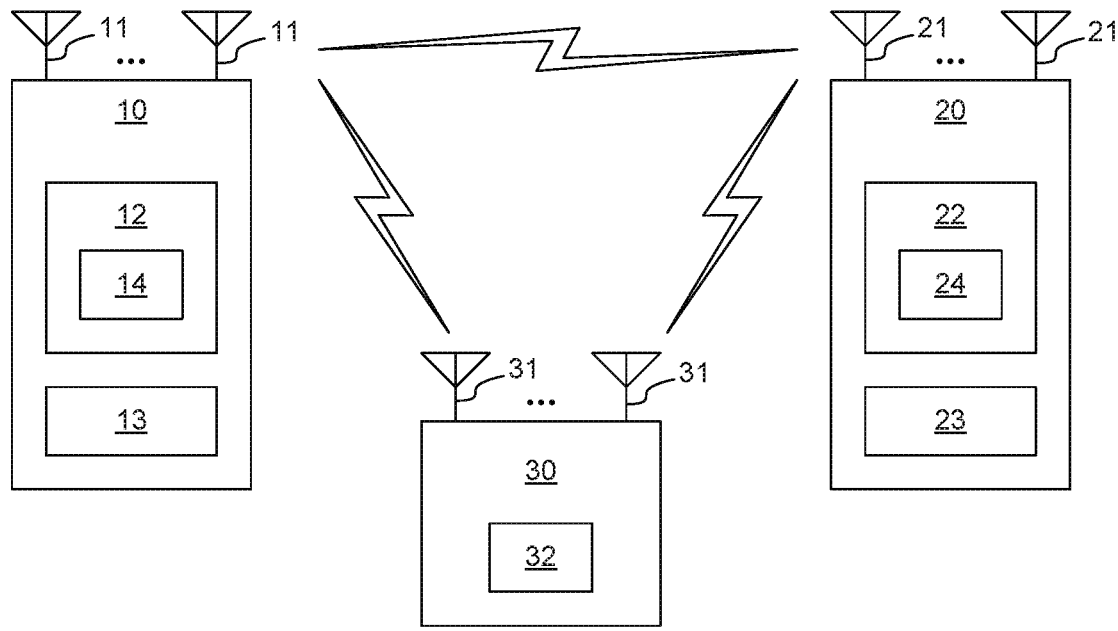
FIG. 1 is a block diagram illustrating an example wireless system including a network device capable of channel scheduling for spatial reuse according to the present disclosure.

Each access point (AP) has a certain RF coverage area. When the distance between adjacent APs is relatively close, the RF coverage areas of adjacent APs may overlap with each other. So, the overlapping RF coverage area between adjacent APs may be referred to as an overlapping area, and a client located in the overlapping area may be referred to as an overlapping client.

When at least two APs send signals to an overlapping area simultaneously, channel collision may occur. For example, when there is an overlapping area between two APs and both APs send signals to an overlapping client in the overlapping area, the overlapping client may simultaneously receive signals sent by the two APs so that a channel collision occurs. Since the two APs use less sensitive CCA threshold, more channel collisions may occur.

Accordingly, in the examples herein, when the distance between a network device and other adjacent network devices is relatively close, the network device may determine an overlapping area between the network device and adjacent network device and overlapping clients located in the overlapping area. After synchronizing the clock with adjacent network device, the network device may negotiate with other network device to generate and allocate respective overlapping access window, overlapping forbidden window and non-overlapping access window for the network device and the other adjacent network device in beacon intervals.

Wherein, during the overlapping access window, the network device may send frame to the overlapping area, meanwhile the network device may also send frame to other areas; during the overlapping forbidden window, the network device is not allowed to transmit frame to the overlapping area and is not allowed to send the high-powered Omni-directional signal to the air interface; during the non-overlapping access window, the network device is allowed to send frame to non-overlapping clients and is allowed to send frame to overlapping client.

Then, the allocated overlapping access window, overlapping forbidden window and non-overlapping access window may be stored as channel scheduling rules for spatial reuse in a channel scheduler of the network device. Therefore, the frame transmission of the network device may be controlled according to the channel scheduling rules. With the above method, downlink channel collisions can be obviously reduced without sacrificing simultaneous transmit. Moreover, since the channel collision can be avoided through the above method, the Inter-BSS CCA threshold can be more flexibly set.

In one example, a first network device comprises a processor to determine that a client device is located in an overlapping area between the first network device and a second network device, to synchronize a first clock of the first network device with a second clock of the second network device, to negotiate, with the second network device, a overlapping access window, an overlapping forbidden window, and a non-overlapping access window for the first network device and the second network device in beacon intervals, to allocate the overlapping access window, the overlapping forbidden window, and the non-overlapping access window by the first network device; store the allocated overlapping access window, the allocated overlapping forbidden window, and the allocated non-overlapping access window as channel scheduling rules for spatial reuse, and to control frame transmission of the network device based on the channel scheduling rules.

In another example, a method for channel scheduling for spatial reuse comprises: determining, by a processor of a first network device, that a client device is located in an overlapping area between the first network device and a second network device; synchronizing, by the processor, a first clock of the first network device with a second clock of the second network device; negotiating, by the processor, with the second network device, a overlapping access window, an overlapping forbidden window, and a non-overlapping access window for the first network device and the second network device in beacon intervals; allocating, by the processor, the overlapping access window, the overlapping forbidden window, and the non-overlapping access window by the first network device; storing, by the processor, the allocated overlapping access window, the allocated overlapping forbidden window, and the allocated non-overlapping access window as channel scheduling rules for spatial reuse; and controlling, by the channel scheduler, frame transmission of the AP based on the channel scheduling rules.

In another example, a non-transitory computer readable storage medium storing instructions that, when executed by a processor of an AP, causes the processor to determine that a client device is located in an overlapping area between the first network device and a second network device, to synchronize a first clock of the first network device with a second clock of the second network device, to negotiate, with the second network device, a overlapping access window, an overlapping forbidden window, and a non-overlapping access window for the first network device and the second network device in beacon intervals, to allocate the overlapping access window, the overlapping forbidden window, and the non-overlapping access window by the first network device, to store the allocated overlapping access window, the allocated overlapping forbidden window, and the allocated non-overlapping access window as channel scheduling rules for spatial reuse, and to control frame transmission of the network device based on the channel scheduling rules.

As used herein, a "network device" generally includes a device that is adapted to transmit and/or receive signaling and to process information within such signaling and to provide wireless local area network services to a station (e.g., any data processing equipment such as a computer, cellular phone, personal digital assistant, tablet devices, etc.). The "network device" may include access points, data transfer devices, network switches, routers, controllers, etc. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

It is appreciated that examples described herein below may include various components and features. Some of the components and features may be removed and/or modified without departing from a scope of the device, method and non-transitory computer readable storage medium. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a block diagram illustrating an example wireless system including a network device capable of channel scheduling for spatial reuse according to the present disclosure. Referring to FIG. 1, a wireless system, e.g. a wireless local area networks (WLAN), comprises a network device 10, at least one adjacent network device 20 and at least one client 30.

The network device 10 and the network device 20 may be APs or any other network devices capable of transmitting wireless transmissions to and receiving wireless transmissions from the client 30.

The client 30 may be a smart phone, a mobile phone, a Personal Digital Assistant (PDA), a portable personal computer, an AIO (all-in-one) computing device, a notebook, a convertible or hybrid notebook, a notebook, a tablet, a cellular device, a desktop computer, a multimedia player, an entertainment unit, a data communication device, a portable reading device, or any other computing device capable of transmitting and receiving wireless transmissions.

The network device 10 may include at least one antenna 11 that may be coupled to a memory 12 storing channel scheduling rules 14 for transmitting the wireless transmissions to and receiving the wireless transmissions from the client 30; the network device 10 also includes processor 13. The network device 20 may also include at least one antenna 21 that may be coupled to a memory 22 storing channel scheduling rules 24 for transmitting the wireless transmissions to and receiving the wireless transmissions from the client 30; the network device 10 also includes processor 23.

The client 30 may include at least one antenna 31 that may be coupled to a RF transceiver 32 for transmitting the wireless transmissions to and receiving the wireless transmissions from the network device 10 or the network device 20.

The network device 10 may include a processor 13. When the distance between the network device 10 and other network devices is relatively close, the processor 13 of the network device 10 may determine at least one overlapping client located in an overlapping area between the network device 10 and other adjacent network devices.

For example, if the network device 10 hears the signal transmitted by a client (e.g., the client 30) through passive listening on the channel, the client may be regarded as visible. If the client is connected with other network device (e.g., the network device 20) and the signal level of the client reaches a preset threshold, the client may be regarded as an overlapping client located in an overlapping area between the network device 10 and the network device 20.

The preset threshold may be set in advance, and its value may depend on the designed density and network capacity. By default, the preset threshold may be set to be the same as the Inter-BSS CCA threshold.

In addition, adjacent network devices may exchange overlapping client information through backbone network or air interface. For example, the network device 10 may tell the network device 20 that some clients fall in overlapping area, so that the network device 20 may treat these clients as overlapping clients.

In addition, in the above example, only two adjacent network devices are shown. However, the above method may also apply to more adjacent network devices.

Moreover, when there is an overlapping area between at least 3 adjacent network devices, overlapping clients in the overlapping area may be grouped.

For example, when there is an overlapping area between network devices A, B and C, overlapping clients in overlapping areas between network devices A and B may be grouped into a first client-group, and overlapping clients in overlapping areas between network devices A and C may be grouped into a second client-group, and overlapping clients in overlapping areas between network devices B and C may be grouped into a third client-group.

After determining overlapping client in the overlapping area, the processor 13 of the network device 10 may synchronize the clock with other network device. For example, the network device 10 and the network device 20 may synchronize clock with each other through Timing Synchronization Function (TSF) in beacon.

After synchronizing the clock, the processor 13 of the network device 10 may negotiate with other network device to generate and allocate respective overlapping access window, overlapping forbidden window and non-overlapping access window for the network device and other network device in beacon intervals.

Figure 2:
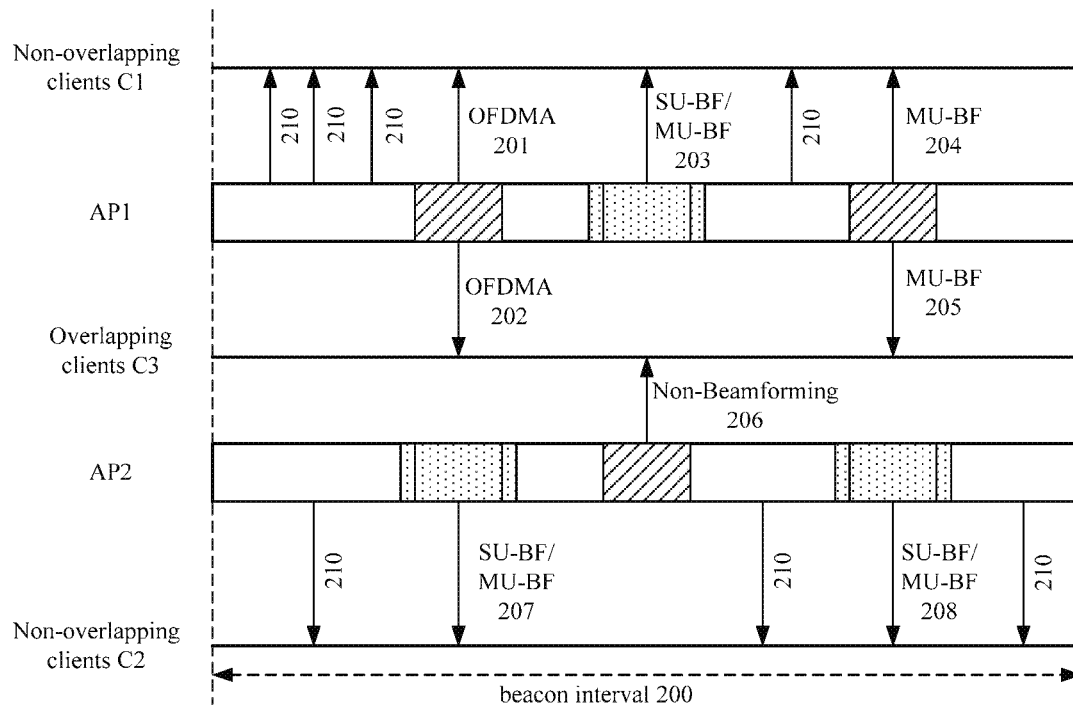
FIG. 2 is a diagram illustrating an example channel scheduling rules configuration procedure according to present disclosure.

FIG. 2 is a diagram illustrating an example channel scheduling rules configuration procedure according to present disclosure. Referring to FIG. 2, in one example, AP1 and AP2 may negotiate to generate and allocate their respective overlapping access window, overlapping forbidden window and non-overlapping access window in a beacon interval 200.

Before starting the negotiation, a master AP may be preset to initiate the channel scheduling rules configuration procedure. For example, an AP with the smallest Medium Access Control (MAC) address may be set as the master AP, or an AP with the largest MAC address may also be set as a master AP. In FIG. 2, for example, AP1 may be preset as the master AP.

As shown in FIG. 2, AP1 and AP2 may generate and allocate their own overlapping access window, overlapping forbidden window and non-overlapping access window in beacon intervals as follows:

a) AP1 may allocate unused time units as AP1's overlapping access window (e.g., the slashed area as shown in FIG. 2) in a beacon interval 200, and may inform AP2 of the information of the allocated overlapping access window.

For example, AP2 may be informed of the information of the allocated overlapping access window through a request message.

b) After receiving the above information, the AP2 may allocate its own overlapping forbidden window and overlapping access window in the beacon interval 200 according to the received information.

For example, the AP2 may check whether the time units corresponding to the overlapping access window of the AP1 in the beacon interval 200 conflicts with the time units that the AP2 wishes to allocate as its own overlapping access window according to the received message; if not, AP2 may allocate the time units corresponding to the overlapping access window of the AP1 in the beacon interval as its own overlapping forbidden window (e.g., the point area as shown in FIG. 2), and may allocate the wished time units as its own overlapped access window; if conflicts, AP2 may allocate non-conflicting time units in the beacon interval as its own overlapping access window, and may allocate the time units corresponding to the overlapping access window of the AP1 in the beacon interval 200 as its overlapping forbidden window.

c) AP2 may inform AP1 of the information of the overlapping access window of AP2.

For example, AP1 may be informed of the information of the overlapping access window of AP2 through a request message.

d) After receiving the above information, the AP1 may allocate its own overlapping forbidden window in the beacon interval according to the received information.

For example, the AP1 may allocate the time units corresponding to the overlapping access window of the AP2 in the beacon interval 200 as its overlapping forbidden window. Therefore, AP1's overlapping access window may correspond to AP2's overlapping forbidden window, and AP1's overlapping forbidden window may correspond to AP2's overlapping access window.

e) AP1 and AP2 may allocate their own non-overlapping access window according to their respective overlapping access window and overlapping forbidden window.

For example, AP1 may allocate other time units in the beacon interval 200 other than the overlapping access window and overlapping forbidden window as non-overlapping access window (e.g., the blank areas as shown in FIG. 2). Similarly, AP2 may also do similar operations at the same time.

Through the above method, AP1 and AP2 may generate and allocate their own overlapping access window, overlapping forbidden window and non-overlapping access window in beacon intervals.

Further, in another example, when the overlapping forbidden window is allocated according to the overlapping access window, at least one time unit may be added to both sides of the time unit corresponding to the overlapping access window, and these time units may be allocated as overlapping forbidden window, so that the duration of the overlapping forbidden window is wider than the duration of the corresponding overlapping access window, as shown in FIG. 2.

After the overlapping access window, overlapping forbidden window and non-overlapping access window are allocated in the beacon interval 200, the allocated overlapping access window, overlapping forbidden window and non-overlapping access window may be stored as channel scheduling rules 14 for spatial reuse in the memory 12 of the network device 10. Therefore, the frame transmission of the network device 10 may be controlled according to the channel scheduling rules 14.

For example, during the overlapping access window, the network device 10 may send frame to the overlapping area; meanwhile the network device 10 may also send frame to other areas, as shown in FIG. 2, such as Orthogonal Frequency Division Multiple Access (OFDMA) frames: OFDMA 201, OFDMA 202, etc., User Beamforming (MU-BF, Multi User Beamforming) frames: such as MU-BF 204, MU-BF 205, etc., Non-Beamforming 206 etc.

Therefore, in other periods that are not overlapping access window, the network device 10 may buffer the traffic of the overlapping client in the overlapping area. Then, until during the period of the overlapping access window, the network device 10 may send the buffered traffic to the overlapping client C3 in the overlapping area.

However, when the network device 10 is performing simultaneous transmit such as Orthogonal Frequency Division Multiple Access (OFDMA) and Multi-User Multiple Input Multiple Output (MU-MIMO), or when there is no overlapping client's traffic, the network device 10 may use the time units corresponding to the overlapping access window for other clients that are not in the overlapping area.

For another example, during the overlapping forbidden window, the network device 10 may be not allowed to transmit frame to the overlapping area and may be not allowed to send the high-powered Omni-directional signal to the air interface. During this period, the network device 10 may send directional frames such as Single User Beamforming (SU-BF) 203, 207, 208 or Multi User Beamforming (MU-BF) to clients outside the overlapping area, or send a low power Omni-directional signal to the air interface.

For another example, during non-overlapping access window, the network device 10 may be allowed to send frame to non-overlapping clients (i.e., C1, C2) and is not allowed to send frame to overlapping client. At this point, there are no additional limits on channel access. The network device 10 just needs to follow the standard 802.11 protocol. Although Wi-Fi signals may also collide in overlapping area, but it is harmless because the packet is not suitable for overlapping area clients.

Figure 3:
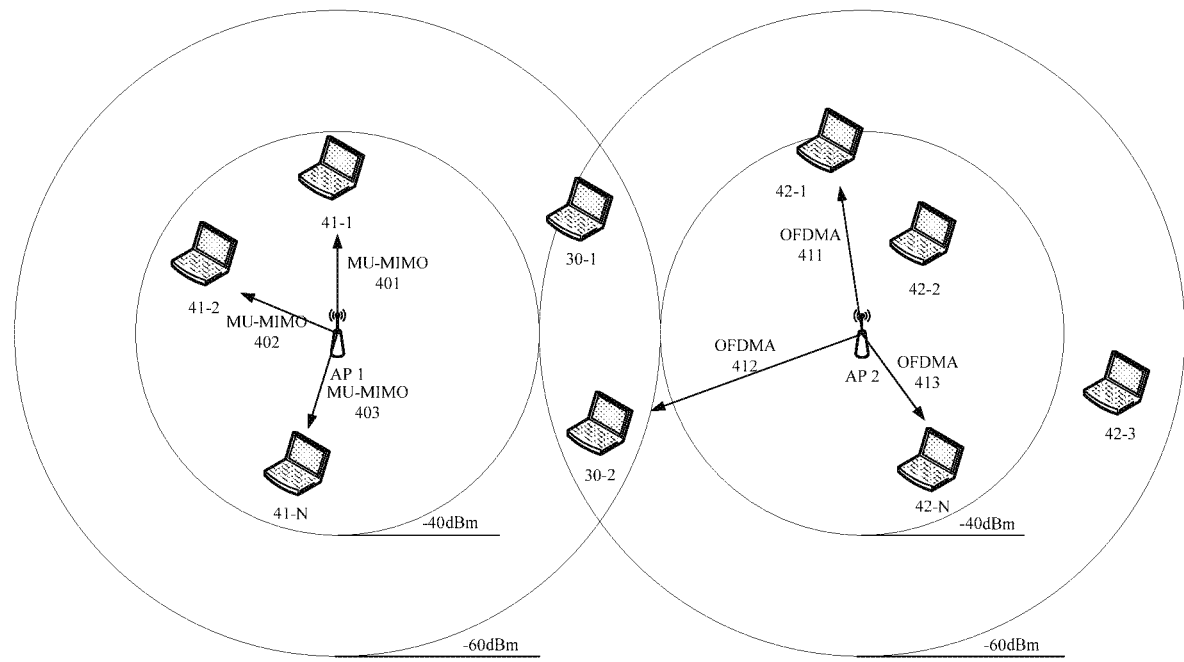
FIG. 3 is a block diagram illustrating another example wireless system including a network device capable of channel scheduling for spatial reuse according to the present disclosure.

FIG. 3 is a block diagram illustrating another example wireless system including a network device capable of channel scheduling for spatial reuse according to the present disclosure. Referring to FIG. 3, AP1 and AP2 are adjacent, and both AP1 and AP2 can send signals with different transmission powers (eg, −40 dbm and −60 dbm). Therefore, there is an overlapping area between AP1 and AP2. There may be multiple clients (i.e., 30-1, 30-2, 41-1, 41-2, . . . , 41-N) within the coverage of AP1. There may be multiple clients (i.e., 30-1, 30-2, 42-1, 42-2, . . . , 42-N) within the coverage of AP2. Wherein, the clients 30-1 and 30-2 located in the overlapping area between AP1 and AP2 are overlapping clients.

As shown in FIG. 3, if there is an overlapping area between AP1 and AP2 and there are overlapping clients in the overlapping area, and AP2 is during its overlapping access window, AP2 may send frame to the overlapping clients in the overlapping area through OFDMA (eg, OFDMA 411, 412, and 413, etc.); meanwhile, AP2 may also send frame to other areas. At this time, AP1 is in the overlapping forbidden window, so AP1 is not allowed to send a signal to the overlapping area, and is not allowed to send the high-powered Omni-directional signal to the air interface, but it is allowed to send frame to non-overlapping clients outside the overlapping area through MU-MIMO (eg, MU-MIMO 401, 402, 403, etc.).

Figure 4:
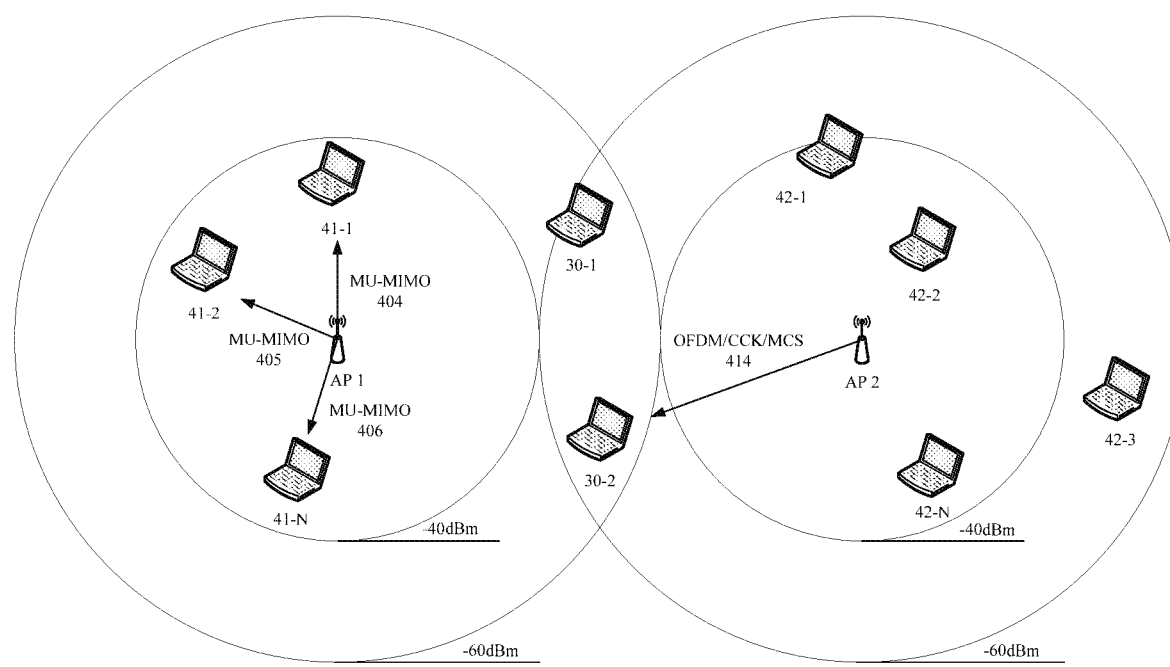
FIG. 4 is a block diagram illustrating another example wireless system including a network device capable of channel scheduling for spatial reuse according to the present disclosure.

FIG. 4 is a block diagram illustrating another example wireless system including a network device capable of channel scheduling for spatial reuse according to the present disclosure.

As shown in FIG. 4, if there is an overlapping area between AP1 and AP2 and there are overlapping clients in the overlapping area, and AP2 is during its overlapping access window, AP2 may send frame to the overlapping clients in the overlapping area through Orthogonal Frequency Division Multiplexing (OFDM), Complementary Code Keying (CCK) and/or Modulation and Coding Scheme (MCS) (eg, OFDM/CCK/MCS 414, etc.); meanwhile, AP2 may also send frame to other areas. At this time, AP1 is in the overlapping forbidden window, so AP1 is not allowed to send a signal to the overlapping area, and is not allowed to send the high-powered Omni-directional signal to the air interface, but it is allowed to send frame to non-overlapping clients outside the overlapping area through MU-MIMO (eg, MU-MIMO 404, 405, 406, etc.).

Figure 5:
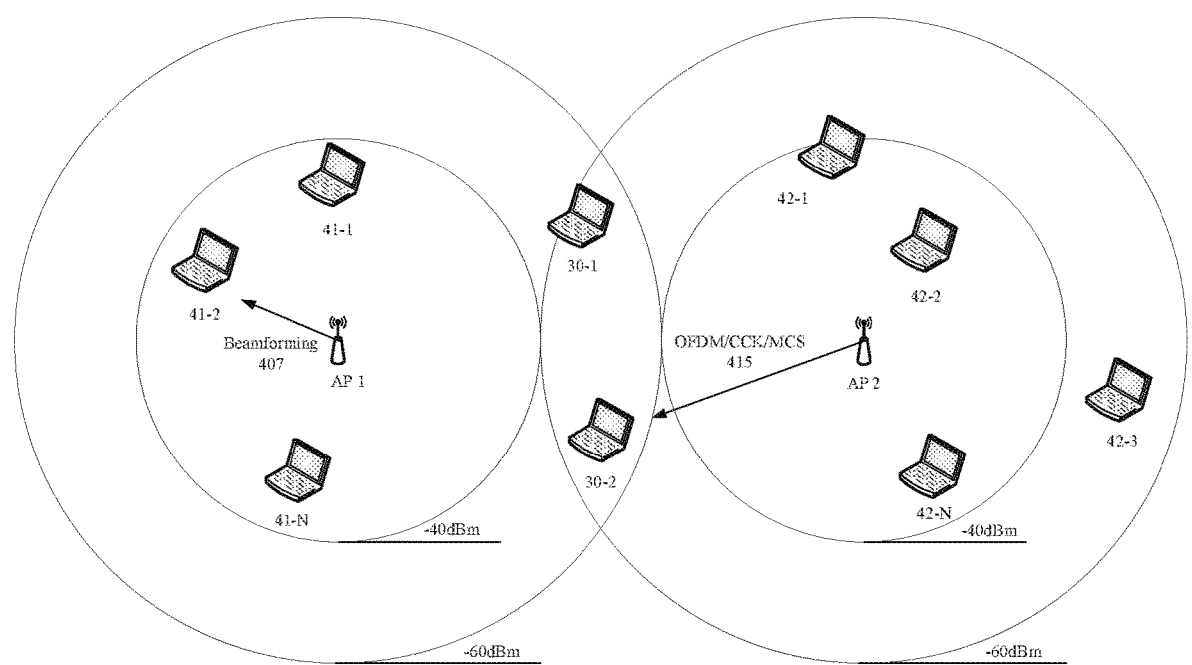
FIG. 5 is a block diagram illustrating another example wireless system including a network device capable of channel scheduling for spatial reuse according to the present disclosure.

FIG. 5 is a block diagram illustrating another example wireless system including a network device capable of channel scheduling for spatial reuse according to the present disclosure.

As shown in FIG. 5, if there is an overlapping area between AP1 and AP2 and there are overlapping clients in the overlapping area, and AP2 is during its overlapping access window, AP2 may send frame to the overlapping clients in the overlapping area through OFDM, CCK and/or MCS (eg, OFDM/CCK/MCS 415, etc.); meanwhile, AP2 may also send frame to other areas. At this time, AP1 is in the overlapping forbidden window, so AP1 is not allowed to send a signal to the overlapping area, and is not allowed to send the high-powered Omni-directional signal to the air interface, but it is allowed to send directional frames such as Single User Beamforming (SU-BF) or Multi User Beamforming (MU-BF) (eg, Beamforming 407, etc.) to non-overlapping clients outside the overlapping area.

Figure 6:
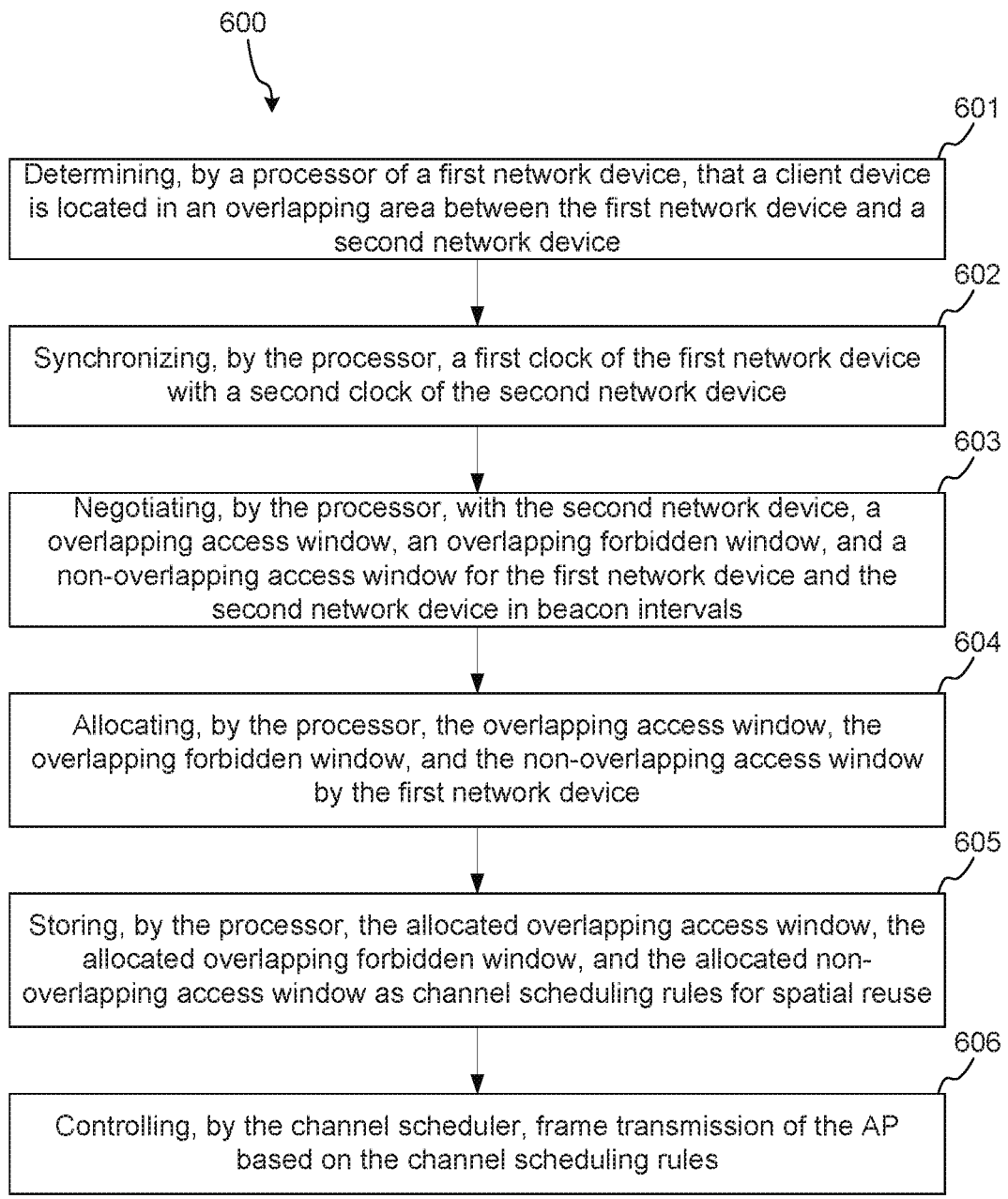
FIG. 6 is a flow chart illustrating an example method for channel scheduling for spatial reuse according to present disclosure.

FIG. 6 is a flow chart illustrating an example method for channel scheduling for spatial reuse according to present disclosure.

Referring to FIG. 6: A method 600 for channel scheduling for spatial reuse comprises: determining, by a processor of a first network device, that a client device is located in an overlapping area between the first network device and a second network device, at 601.

The method 600 comprises synchronizing, by the processor, a first clock of the first network device with a second clock of the second network device, at 602.

The method 600 comprises negotiating, by the processor, with the second network device, a overlapping access window, an overlapping forbidden window, and a non-overlapping access window for the first network device and the second network device in beacon intervals, at 603.

The method 600 comprises allocating, by the processor, the overlapping access window, the overlapping forbidden window, and the non-overlapping access window by the first network device, at 604.

The method 600 comprises storing, by the processor, the allocated overlapping access window, the allocated overlapping forbidden window, and the allocated non-overlapping access window as channel scheduling rules for spatial reuse, at 605.

The method 600 comprises controlling, by the channel scheduler, frame transmission of the AP based on the channel scheduling rules, at 606.

Figure 7:
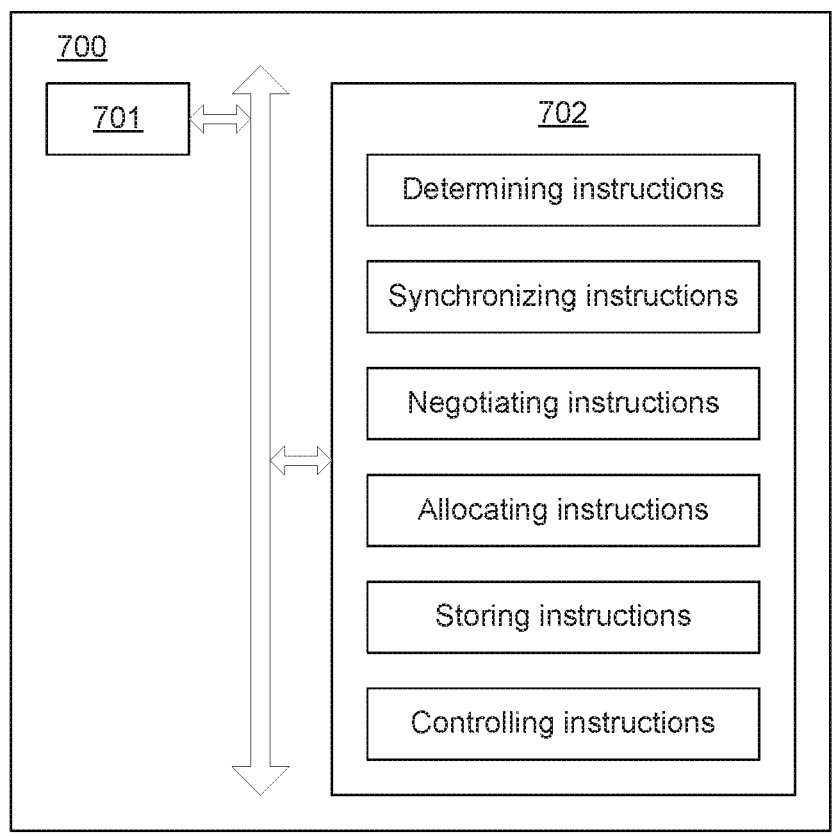
FIG. 7 is a schematic illustrating example components for implementing the network device shown in FIG. 1 according to present disclosure.

FIG. 7 is a schematic illustrating example components for implementing the network device shown in FIG. 1 according to present disclosure. Referring to FIG. 7, the first network device 700 includes a processor 701 and a non-transitory computer readable storage medium 702.

The non-transitory computer readable storage medium 702 stores instructions excitable for the possessor 701.

The instructions include determining instructions, when executed by the processor 701, causes the processor 701 to determine that a client device is located in an overlapping area between the first network device and a second network device.

The instructions include synchronizing instructions, when executed by the processor 701, causes the processor 701 to synchronize a first clock of the first network device with a second clock of the second network device.

The instructions include negotiating instructions, when executed by the processor 701, causes the processor 701 to negotiate, with the second network device, a overlapping access window, an overlapping forbidden window, and a non-overlapping access window for the first network device and the second network device in beacon intervals.

The instructions include allocating instructions, when executed by the processor 701, causes the processor 701 to allocate the overlapping access window, the overlapping forbidden window, and the non-overlapping access window by the first network device.

The instructions include storing instructions, when executed by the processor 701, causes the processor 701 to store the allocated overlapping access window, the allocated overlapping forbidden window, and the allocated non-overlapping access window as channel scheduling rules for spatial reuse.

The instructions include controlling instructions, when executed by the processor 701, causes the processor 701 to control frame transmission of the network device based on the channel scheduling rules.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A first network device comprising:
a processor to:
determine that a client device is located in an overlapping area between the first network device and a second network device;
synchronize a first clock of the first network device with a second clock of the second network device;
negotiate, with the second network device, a overlapping access window, an overlapping forbidden window, and a non-overlapping access window for the first network device and the second network device in beacon intervals;
allocate the overlapping access window, the overlapping forbidden window, and the non-overlapping access window by the first network device;
store the allocated overlapping access window, the allocated overlapping forbidden window, and the allocated non-overlapping access window as channel scheduling rules for spatial reuse; and
control frame transmission of the network device based on the channel scheduling rules, wherein the processor further to generate and allocate the overlapping access window, the overlapping forbidden window and the non-overlapping access window for the first network device in beacon intervals by:
allocating unused time units as the overlapping access window in a particular beacon interval, and transmitting to the second network device of allocated overlapping access window information to allow the second network device to allocate its overlapping forbidden window and overlapping access window in the particular beacon interval;
receiving overlapping access window information from the second network device;
allocating the overlapping forbidden window in the particular beacon interval based on the received overlapping access window information from the second network device;
allocating the non-overlapping access window based on the allocated overlapping access window and allocated overlapping forbidden window for the first network device.

2. The network device of claim 1, wherein, during the overlapping access window, the processor transmits a plurality of frames to the overlapping area; wherein, during the overlapping forbidden window, the processor refrains from transmitting the plurality of frames to the overlapping area and from transmitting high-powered omni-directional signals; and wherein, during the non-overlapping access window, the processor transmits the plurality of frames to a non-overlapping client and refrains from transmitting the plurality of frames to an overlapping client.

3. The network device of claim 1, wherein the overlapping access window of the first network device corresponds to the overlapping forbidden window of the second network device, and wherein the overlapping forbidden window of the first network device corresponds to the overlapping access window of the second network device.

4. The network device of claim 1, wherein a first duration of the overlapping forbidden window of the first network device exceeds a second duration of the overlapping access window of the first network device.

5. The network device of claim 4, wherein in response to the overlapping forbidden window being allocated based on the overlapping access window, the processor adds a first time unit corresponding to the overlapping access window of the first network device and a second time unit corresponding to the overlapping access window of the second network device, and wherein the first and second time units are allocated as an overlapping forbidden window for the first network device and the second network device respectively.

6. A method comprising:
determining, by a processor of a first network device, that a client device is located in an overlapping area between the first network device and a second network device;
synchronizing, by the processor, a first clock of the first network device with a second clock of the second network device;
negotiating, by the processor, with the second network device, a overlapping access window, an overlapping forbidden window, and a non-overlapping access window for the first network device and the second network device in beacon intervals;
allocating, by the processor, the overlapping access window, the overlapping forbidden window, and the non-overlapping access window by the first network device;
storing, by the processor, the allocated overlapping access window, the allocated overlapping forbidden window, and the allocated non-overlapping access window as channel scheduling rules for spatial reuse; and
controlling, by the channel scheduler, frame transmission of the AP based on the channel scheduling rules, wherein the processor further to generate and allocate the overlapping access window, the overlapping forbidden window and the non-overlapping access window for the first network device in beacon intervals by:
allocating unused time units as the overlapping access window in a particular beacon interval, and transmitting to the second network device of allocated overlapping access window information to allow the second network device to allocate its overlapping forbidden window and overlapping access window in the particular beacon interval;
receiving overlapping access window information from the second network device;
allocating the overlapping forbidden window in the particular beacon interval based on the received overlapping access window information from the second network device;
allocating the non-overlapping access window based on the allocated overlapping access window and allocated overlapping forbidden window for the first network device.

7. The method of claim 6, wherein, during the overlapping access window, the processor transmits a plurality of frames to the overlapping area; wherein, during the overlapping forbidden window, the processor refrains from transmitting the plurality of frames to the overlapping area and from transmitting high-powered omni-directional signals; and wherein, during the non-overlapping access window, the processor transmits the plurality of frames to a non-overlapping client and refrains from transmitting the plurality of frames to an overlapping client.

8. The method of claim 6, wherein the overlapping access window of the first network device corresponds to the overlapping forbidden window of the second network device, and wherein the overlapping forbidden window of the first network device corresponds to the overlapping access window of the second network device.

9. The method of claim 6, wherein a first duration of the overlapping forbidden window of the first network device exceeds a second duration of the overlapping access window of the first network device.

10. The method of claim 9, wherein in response to the overlapping forbidden window being allocated based on the overlapping access window, the processor adds a first time unit corresponding to the overlapping access window of the first network device and a second time unit corresponding to the overlapping access window of the second network device, and wherein the first and second time units are allocated as an overlapping forbidden window for the first network device and the second network device respectively.

11. A non-transitory computer readable storage medium storing instructions that, when executed by a processor of a first network device, causes the processor to:
- determine that a client device is located in an overlapping area between the first network device and a second network device;
- synchronize a first clock of the first network device with a second clock of the second network device;
- negotiate, with the second network device, a overlapping access window, an overlapping forbidden window, and a non-overlapping access window for the first network device and the second network device in beacon intervals;
- allocate the overlapping access window, the overlapping forbidden window, and the non-overlapping access window by the first network device;
- store the allocated overlapping access window, the allocated overlapping forbidden window, and the allocated non-overlapping access window as channel scheduling rules for spatial reuse; and
- control frame transmission of the network device based on the channel scheduling rules, wherein the processor further to generate and allocate the overlapping access window, the overlapping forbidden window and the non-overlapping access window for the first network device in beacon intervals by causing the processor to:
- allocate unused time units as the overlapping access window in a particular beacon interval, and transmitting to the second network device of allocated overlapping access window information to allow the second network device to allocate its overlapping forbidden window and overlapping access window in the particular beacon interval;
- receive overlapping access window information from the second network device;
- allocate the overlapping forbidden window in the particular beacon interval based on the received overlapping access window information from the second network device;
- allocate the non-overlapping access window based on the allocated overlapping access window and allocated overlapping forbidden window for the first network device.

12. The non-transitory computer readable storage medium of claim 11, wherein, during the overlapping access window, the processor transmits a plurality of frames to the overlapping area; wherein, during the overlapping forbidden window, the processor refrains from transmitting the plurality of frames to the overlapping area and from transmitting high-powered omni-directional signals; and wherein, during the non-overlapping access window, the processor transmits the plurality of frames to a non-overlapping client and refrains from transmitting the plurality of frames to an overlapping client.

13. The non-transitory computer readable storage medium of claim 11, wherein a first duration of the overlapping forbidden window of the first network device exceeds a second duration of the overlapping access window of the first network device.

* * * * *